(12) United States Patent
Kamisaka et al.

(10) Patent No.: US 10,247,117 B2
(45) Date of Patent: Apr. 2, 2019

(54) CONTROL DEVICE FOR INTERNAL-COMBUSTION ENGINE

(71) Applicant: TOYOTA JIDOSHA KABUSHIKI KAISHA, Toyota-shi, Aichi-ken (JP)

(72) Inventors: Aya Kamisaka, Atsugi (JP); Satoru Tanaka, Yokohama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/620,905

(22) Filed: Jun. 13, 2017

(65) Prior Publication Data

US 2018/0038295 A1 Feb. 8, 2018

(30) Foreign Application Priority Data

Aug. 4, 2016 (JP) .................................. 2016-153825

(51) Int. Cl.
*F02D 41/00* (2006.01)
*F02D 41/36* (2006.01)
(Continued)

(52) U.S. Cl.
CPC ..... *F02D 41/0062* (2013.01); *F02D 41/0072* (2013.01); *F02D 41/0077* (2013.01);
(Continued)

(58) Field of Classification Search
CPC .. F02D 41/00; F02D 41/0062; F02D 41/0077; F02D 41/14; F02D 41/1448;
(Continued)

(56) References Cited

U.S. PATENT DOCUMENTS

| 8,096,125 | B2 * | 1/2012 | Hepburn | F01N 3/021 60/605.2 |
|---|---|---|---|---|
| 2008/0306673 | A1 * | 12/2008 | Yasui | F01N 3/208 701/102 |
| 2009/0132153 | A1 * | 5/2009 | Shutty | F01N 11/002 701/108 |
| 2011/0077836 | A1 * | 3/2011 | Ejiri | F02D 41/0007 701/102 |

(Continued)

FOREIGN PATENT DOCUMENTS

| JP | 2003-166440 A | 6/2003 |
|---|---|---|
| JP | 2004-218524 A | 8/2004 |
| JP | 2014-169684 A | 9/2014 |

*Primary Examiner* — Hung Q Nguyen
*Assistant Examiner* — Johnny H Hoang
(74) *Attorney, Agent, or Firm* — Hunton Andrews Kurth LLP

(57) ABSTRACT

An internal-combustion engine includes an EGR device that recirculates a portion of exhaust gas, as EGR gas, from an exhaust passage to an intake passage through an EGR valve. A control device for the control device is configured to perform: EGR ratio estimation processing that calculates, by using an estimation model, an estimated EGR ratio; and estimation model update processing that updates the estimation model. The estimation model is configured to calculate the estimated EGR ratio based on a pressure parameter being a ratio of or a difference between gas pressures upstream and downstream of the EGR valve. The pressure parameter is represented by a pressure parameter model that is updatable. The estimation model update processing includes: calculating an actual EGR ratio; and updating the pressure parameter model such that the estimated EGR ratio becomes closer to the actual EGR ratio.

8 Claims, 12 Drawing Sheets

(51) Int. Cl.
  *F02D 41/14* (2006.01)
  *F02D 41/24* (2006.01)
  *F02B 3/12* (2006.01)
  *F02B 29/04* (2006.01)
  *F02M 26/06* (2016.01)
  *F02M 26/07* (2016.01)

(52) U.S. Cl.
  CPC ..... *F02D 41/1495* (2013.01); *F02D 41/2445* (2013.01); *F02D 41/2451* (2013.01); *F02D 41/365* (2013.01); *F02B 3/12* (2013.01); *F02B 29/0406* (2013.01); *F02D 41/1448* (2013.01); *F02M 26/06* (2016.02); *F02M 26/07* (2016.02)

(58) Field of Classification Search
  CPC .... F02D 41/1495; F02D 41/36; F02D 41/365; F02B 29/04; F02B 29/0406
  USPC ......... 701/102, 107–109, 114, 115; 123/434, 123/568.16–568.19, 568.21, 568.25, 123/568.26, 674
  See application file for complete search history.

(56) References Cited

U.S. PATENT DOCUMENTS

| | | | |
|---|---|---|---|
| 2014/0251287 A1 | 9/2014 | Takezoe | |
| 2015/0275731 A1* | 10/2015 | Yasui | F01N 3/208 422/105 |
| 2015/0275791 A1* | 10/2015 | Yasui | F02D 41/0007 701/102 |
| 2017/0022941 A1* | 1/2017 | Mallard | F02M 26/19 |
| 2017/0030305 A1* | 2/2017 | Sugiyama | F02D 41/0065 |
| 2017/0101946 A1* | 4/2017 | Conte | F02D 41/0007 |
| 2017/0122164 A1* | 5/2017 | Ulrey | F01N 3/2006 |

* cited by examiner

CONTROL DEVICE FOR INTERNAL-COMBUSTION ENGINE

CROSS-REFERENCE TO RELATED APPLICATION

The present application claims priority to Japanese Patent Application No. 2016-153825 filed on Aug. 4, 2016, which is incorporated herein by reference in its entirety.

BACKGROUND

Technical Field

The present invention relates to a control device for an internal-combustion engine provided with an EGR (Exhaust Gas Recirculation) device.

Background Art

An EGR device that recirculates a portion of exhaust gas, as EGR gas, from an exhaust passage to an intake passage through an EGR valve is conventionally known. The EGR gas returned to the intake passage is mixed with fresh air supplied to the intake passage. A ratio of the amount of the EGR gas to the total amount of the mixed gas is referred to as an "EGR ratio". Since the EGR ratio is used for an operation control of an engine, it is desirable to calculate the EGR ratio with high accuracy.

Patent Literature 1 discloses a technique of calculating an EGR ratio. According to the technique, a flow rate of EGR gas passing through an EGR valve is estimated by the use of an EGR valve model. Then, the EGR ratio is calculated based on the estimated EGR gas flow rate and a fresh air flow rate. It should be noted here that an error between the estimated EGR gas flow rate and an actual EGR gas flow rate is likely to occur due to manufacturing variability and aged deterioration of the EGR device. Therefore, the EGR valve model is corrected through learning such that the error between the estimated EGR gas flow rate and the actual EGR gas flow rate is reduced.

Patent Literature 2 discloses a calculating formula for calculating an air flow rate passing through a throttle valve. According to the calculating formula, the air flow rate passing through the throttle valve depends on an opening of the throttle valve and a pressure ratio. Here, the pressure ratio is a ratio of pressures upstream and downstream of the throttle valve.

Another technique related to the EGR device is disclosed in Patent Literature 3.

LIST OF RELATED ART

Patent Literature 1: JP-2014-169684 A
Patent Literature 2: JP-2004-218524 A
Patent Literature 3: JP-2003-166440 A

SUMMARY

A flow rate of EGR gas passing through an EGR valve is thought to depend on an opening of the EGR valve and a pressure ratio, as in the case of the throttle valve disclosed in Patent Literature 2. Here, the pressure ratio is a ratio of gas pressures upstream and downstream of the EGR valve. Since the EGR gas flow rate depends on both the EGR valve opening and the pressure ratio, not only an error of the EGR valve opening but also an error of the pressure ratio contributes to an estimation error of the EGR ratio. However, according to the technique described in Patent Literature 1, the error of the pressure ratio is not considered explicitly. This means that accuracy of the EGR valve model is not enough, namely, estimation accuracy of the EGR ratio is not enough.

An object of the present invention is to provide a technique that can improve the estimation accuracy of the EGR ratio in an internal-combustion engine provided with an EGR device.

A first invention provides a control device for an internal-combustion engine and has the following features.

The internal-combustion engine has an EGR device configured to recirculate a portion of exhaust gas, as EGR gas, from an exhaust passage to an intake passage through an EGR valve.

The control device is configured to perform:

EGR ratio estimation processing that calculates, by using an estimation model, an estimated EGR ratio being an estimate of an EGR ratio; and estimation model update processing that updates the estimation model.

The estimation model is configured to calculate the estimated EGR ratio based on a pressure parameter being a ratio of or a difference between gas pressures upstream and downstream of the EGR valve.

The pressure parameter is represented by a pressure parameter model that is updatable.

The estimation model update processing includes:

calculating an actual EGR ratio; and updating the pressure parameter model such that the estimated EGR ratio becomes closer to the actual EGR ratio.

A second invention further has the following features in addition to the first invention.

The pressure parameter model includes:

the pressure parameter; and a first correction value being a correction value of the pressure parameter.

In the estimation model update processing, the control device updates the first correction value such that the estimated EGR ratio becomes closer to the actual EGR ratio.

A third invention further has the following features in addition to the second invention.

The internal-combustion engine further has a first sensor that detects a fresh air flow rate in the intake passage.

The pressure parameter and the first correction value each is represented as a function of the fresh air flow rate.

The control device uses the fresh air flow rate to calculate the pressure parameter and the first correction value.

A fourth invention further has the following features in addition to the third invention.

The first correction value is represented by $c \times ga^2$, where c is a correction coefficient, and ga is the fresh air flow rate.

In the estimation model update processing, the control device updates the correction coefficient c such that the estimated EGR ratio becomes closer to the actual EGR ratio.

A fifth invention further has the following features in addition to the second invention.

The internal-combustion engine further has a second sensor group that detects the gas pressures upstream and downstream of the EGR valve.

The control device calculates the pressure parameter by using the gas pressures detected by the second sensor group.

A sixth invention further has the following features in addition to any of the first to fifth inventions.

The estimation model is configured to calculate the estimated EGR ratio based on the pressure parameter and an opening of the EGR valve.

The opening in the estimation model is represented by a valve opening model that is updatable.

In the estimation model update processing, the control device updates the pressure parameter model and the valve opening model such that the estimated EGR ratio becomes closer to the actual EGR ratio.

A seventh invention further has the following features in addition to the fourth invention.

The internal-combustion engine further has a third sensor that detects an opening of the EGR valve.

The estimation model is configured to calculate the estimated EGR ratio based on the pressure parameter and the opening.

The opening in the estimation model is represented by a valve opening model that is updatable.

The valve opening model includes:
the opening detected by the third sensor; and
a second correction value being a correction value of the opening.

In the estimation model update processing, the control device updates the correction coefficient c and the second correction value such that the estimated EGR ratio becomes closer to the actual EGR ratio.

An eighth invention further has the following features in addition to the seventh invention.

A first detected parameter includes the fresh air flow rate and the opening in a first operating state.

A first actual EGR ratio is the actual EGR ratio in the first operating state.

A second detected parameter includes the fresh air flow rate and the opening in a second operating state different from the first operating state.

A second actual EGR ratio is the actual EGR ratio in the second operating state.

The control device updates the correction coefficient c and the second correction value such that the estimated EGR ratio corresponding to the first detected parameter becomes closer to the first actual EGR ratio and the estimated EGR ratio corresponding to the second detected parameter becomes closer to the second actual EGR ratio.

According to the first invention, the pressure parameter in the estimation model for calculating the estimated EGR ratio is represented by the pressure parameter model that is updatable. By updating the pressure parameter model such that the estimated EGR ratio becomes closer to the actual EGR ratio, it is possible to reduce an error of the estimated EGR ratio caused by an error of the pressure parameter. In this manner, the error of the pressure parameter is considered in the estimation model, and thereby accuracy of the estimated EGR ratio is improved. Since the accuracy of the estimated EGR ratio is improved, disturbance in an air-fuel ratio and occurrence of misfire can be suppressed.

According to the second invention, the pressure parameter model includes the first correction value for correcting the error of the pressure parameter. In order to update the pressure parameter model, a formula itself for calculating the pressure parameter does not need to be updated, but the first correction value only has to be updated. Thus, the number of variables that should be updated is small, which is preferable in terms of reduction in computation load and computation time.

According to the third invention, the pressure parameter and the first correction value each is represented as a function of the fresh air flow rate. Since the error of the pressure parameter varies depending on the fresh air flow rate, it is possible to correct the error of the pressure parameter with high accuracy by representing the first correction value as a function of the fresh air flow rate. In particular, high estimation accuracy can be maintained even in a transition period during which the fresh air flow rate varies. Moreover, there is no need to newly install pressure sensors for directly measuring the gas pressures upstream and downstream of the EGR valve, which is preferable in terms of reduction in costs.

According to the fourth invention, the first correction value is represented by $c \times ga^2$. In this case, the number of variables that should be updated in the estimation model becomes small. Therefore, the computation load and the computation time required for updating the estimation model can be suppressed.

According to the fifth invention, the pressure parameter is calculated by the use of the gas pressures detected by the second sensor group. In this case, there is no need to use an approximate equation for calculating the pressure parameter.

According to the sixth invention, an error of the opening of the EGR valve is further considered in the estimation model.

According to the seventh invention, an error of the opening of the EGR valve is further considered in the estimation model. Here, variables that should be updated in the estimation model are only two, the correction coefficient c and the second correction value. Therefore, the computation load and the computation time required for updating the estimation model can be suppressed.

According to the eighth invention, it is possible to concurrently and quickly update the correction coefficient c and the second correction value by using the detected parameters in the two operating states.

EMBODIMENTS

Embodiments of the present invention will be described below with reference to the attached drawings.

1. First Embodiment 1-1. Configuration of Internal-Combustion Engine

Figure 1:
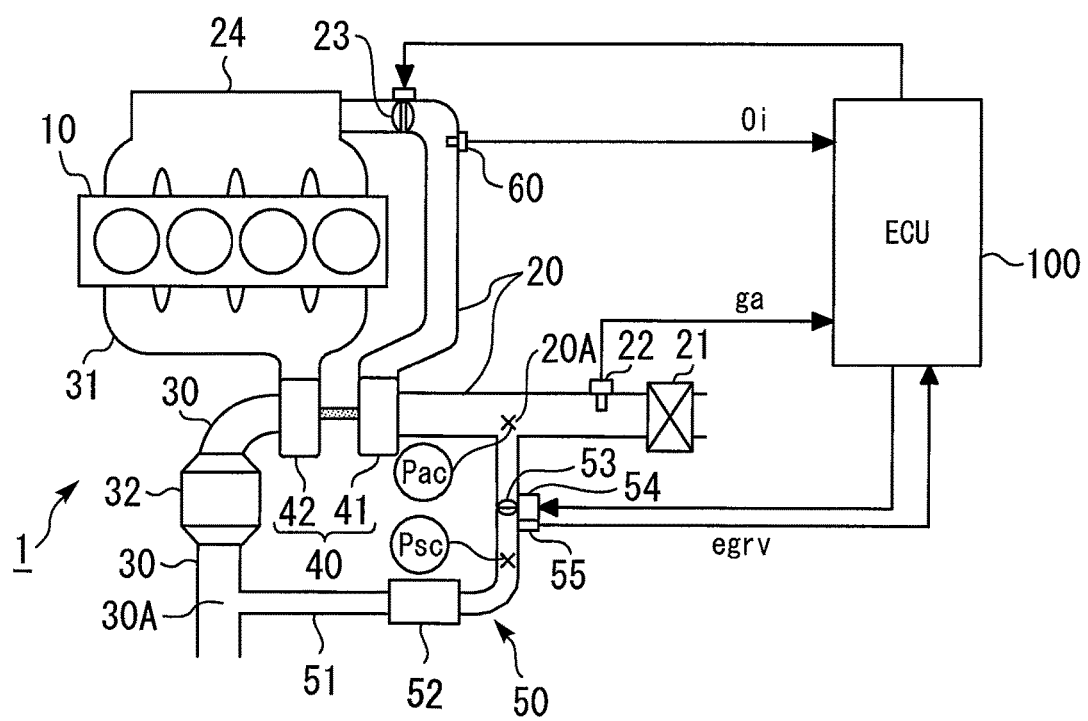
FIG. 1 is a schematic diagram showing a configuration of an internal-combustion engine according to a first embodiment of the present invention.

FIG. 1 is a schematic diagram showing a configuration of an internal-combustion engine 1 (engine) according to the first embodiment. The internal-combustion engine 1 is provided with an engine main unit 10, an intake passage 20, an exhaust passage 30, a supercharger 40, an EGR device 50, an intake $O_2$ sensor 60, and a control device 100.

The intake passage 20 is provided upstream of the engine main unit 10. An air cleaner 21 is provided at a most upstream section of the intake passage 20. An air flow meter 22 is provided downstream of the air cleaner 21. The air flow meter 22 is a sensor that detects a mass flow rate of fresh air introduced into the intake passage 20. The mass flow rate of the fresh air detected by the air flow meter 22 is hereinafter referred to as a "fresh air flow rate ga".

A compressor 41 of the supercharger 40 is provided downstream of the air flow meter 22. The compressor 41 is connected to a turbine 42 through a shaft. A throttle valve 23 is provided in the intake passage 20 downstream of the compressor 41. An intake manifold 24 including a surge tank is provided downstream of the throttle valve 23. The intake manifold 24 is connected so as to introduce the intake gas into each cylinder of the engine main unit 10.

An exhaust passage 30 is provided downstream of the engine main unit 10. More specifically, an exhaust manifold 31 is connected to an exhaust opening of each cylinder of the engine main unit 10. The turbine 42 of the supercharger 40 is provided downstream of the exhaust manifold 31. When the turbine 42 is rotated by an exhaust gas flow from the engine main unit 10, the compressor 41 on the intake side also is rotated to compress the intake gas. A catalyst 32 is provided in the exhaust passage 30 downstream of the turbine 42. For example, the catalyst 32 is a start converter.

The EGR device 50 is configured to connect between the exhaust passage 30 and the intake passage 20 and to recirculate a portion of exhaust gas flowing through the exhaust passage 30 to the intake passage 20. In the present embodiment, as shown in FIG. 1, the EGR device 50 takes in a part of the exhaust gas from an exhaust passage 30A downstream of the catalyst 32. Then, the EGR device 50 emits the taken exhaust gas into an intake passage 20A between the air cleaner 21 and the compressor 41. That is, the EGR device 50 connects between the exhaust passage 30A and the intake passage 20A, and recirculates a portion of the exhaust gas flowing through the exhaust passage 30A from the exhaust passage 30A to the intake passage 20A. The EGR device 50 having such a configuration is called an LPL (Low Pressure Loop)—EGR device.

The exhaust gas returned by the EGR device 50 from the exhaust passage 30A to the intake passage 20A is hereinafter referred to as "EGR gas". An EGR passage 51 is a flow path of the EGR gas and connects between the exhaust passage 30A and the intake passage 20A. An EGR cooler 52 and an EGR valve 53 are provided in the EGR passage 51. The EGR cooler 52 is provided for cooling the EGR gas. The EGR valve 53 is a valve for adjusting a flow rate of the EGR gas. The flow rate of the EGR gas returned from the exhaust passage 30A to the intake passage 20A through the EGR valve 53 can be adjusted by changing an opening of the EGR valve 53.

More specifically, the EGR valve 53 is connected to a motor 54 as an actuator. The EGR valve 53 opens and closes with rotation of the motor 54, and thereby the opening of the EGR valve 53 is changed. An opening sensor 55 is attached to the motor 54 and detects the opening of the EGR valve 53 based on a rotation angle of the motor 54. The opening of the EGR valve 53 detected by the opening sensor 55 is hereinafter referred to as a "valve opening egrv".

The intake $O_2$ sensor 60 detects an oxygen ($O_2$) concentration in the intake gas. Here, the intake gas is a mixed gas of the fresh air and the EGR gas in the intake passage 20. In the example shown in FIG. 1, the intake $O_2$ sensor 60 is provided at the intake passage 20 between the compressor 41 and the throttle valve 23. The concentration detected by the intake $O_2$ sensor 60 is hereinafter referred to as an "intake $O_2$ concentration Oi".

The control device 100 is a microcomputer that controls an operation of the internal-combustion engine 1 and is called an ECU (Electronic Control Unit). The control device 100 receives a variety of state information from sensors installed in the internal-combustion engine 1 and a vehicle. For example, in FIG. 1, the control device 100 receives information of the fresh air flow rate ga, the valve opening egrv, and the intake $O_2$ concentration Oi from the air flow meter 22, the opening sensor 55, and the intake $O_2$ sensor 60, respectively. Then, the control device 100 performs a variety of arithmetic processing and an operation control of the internal-combustion engine 1 based on the received state information.

The control device 100 is provided with a processor, a memory, and an input/output interface. The control device 100 receives the state information from the sensors and transmits commands to actuators through the input/output interface. A control program is stored in the memory, and the processor executes the control program to achieve functions of the control device 100.

One of the functions of the control device 100 is to control an EGR ratio. The EGR ratio is a ratio of the amount of the EGR gas to the total amount of the mixed gas of the fresh air and the EGR gas. The control device 100 determines a target EGR ratio depending on an engine operating condition (for example, a rotational speed and a load). Meanwhile, the control device 100 estimates a current EGR ratio based on the state information received from the sensors. Then, the control device 100 controls the flow rate of the EGR gas such that the estimated EGR ratio becomes equal to the target EGR ratio. To control the flow rate of the EGR gas, the control device 100 outputs a command to the motor 54 to change the opening of the EGR valve 53.

Here, if estimation accuracy of the EGR ratio is low, the target EGR ratio cannot be actually achieved even when the EGR ratio is controlled to be equal to the target EGR ratio. That is to say, a considerable error between the actual EGR ratio and the target EGR ratio is caused. This error causes disturbance in an air-fuel ratio.

Moreover, the control device 100 may determine an optimum ignition timing based on the estimated EGR ratio. However, if the estimation accuracy of the EGR ratio is low, the ignition timing determined based on the estimated EGR ratio is not likely to be optimum with respect to the actual EGR ratio, which causes misfire.

In view of the above, the estimation accuracy of the EGR ratio being low is not preferable in terms of the engine operation control. According to the present embodiment, a technique that can improve the estimation accuracy of the EGR ratio is proposed. First of all, let us explain in detail an "estimation model" that is used for estimating the EGR ratio in the present embodiment.

1-2. Explanation of Estimation Model

An EGR ratio Regr is defined by the following equation (1).

[Equation 1]

$$Regr = \frac{Gegr}{Gegr + ga} \quad (1)$$

In the above equation (1), ga represents the fresh air flow rate which is detected by the air flow meter 22 as mentioned above. Gegr represents the mass flow rate of the EGR gas that is returned by the EGR device 50 from the exhaust passage 30A to the intake passage 20A. According to the present embodiment, the mass flow rate Gegr of the EGR gas is calculated (estimated) by the use of the estimation model. Such the mass flow rate Gegr of the EGR gas is hereinafter referred to as an "estimated EGR gas flow rate Gegr". Moreover, the EGR ratio Regr calculated by using the equation (1) is hereinafter referred to as an "estimated EGR ratio Regr". It should be noted that we can equate the calculation of the estimated EGR gas flow rate Gegr to the calculation of the estimated EGR ratio Regr.

The estimated EGR gas flow rate Gegr is given by the following equation (2).

[Equation 2]

$$Gegr = Begr(egrv) \times \Phi\left(\frac{Pac}{Psc}\right) \quad (2)$$

In the equation (2), Begr represents a flow coefficient. The flow coefficient Begr here includes an effective opening area of the EGR valve 53 as a parameter and thus depends on the valve opening egrv of the EGR valve 53. In other words, the flow coefficient Begr is represented as a function of the valve opening egrv.

In the equation (2), Psc represents a gas pressure upstream of the EGR valve 53, namely, a gas pressure on the side of the exhaust passage 30A as seen from the EGR valve 53. On the other hand, Pac represents a gas pressure downstream of the EGR valve 53, namely, a gas pressure on the side of the intake passage 20A as seen from the EGR valve 53. A parameter Pac/Psc represents a ratio of the gas pressures upstream and downstream of the EGR valve 53. The parameter Pac/Psc is hereinafter simply referred to as a "pressure ratio".

As shown in the equation (2), the estimated EGR gas flow rate Gegr is represented by a product of Begr as a function of the valve opening egrv and Φ as a function of the pressure ratio Pac/Psc. In other words, the estimated EGR gas flow rate Gegr depends on the valve opening egrv and the pressure ratio Pac/Psc.

Figure 2:
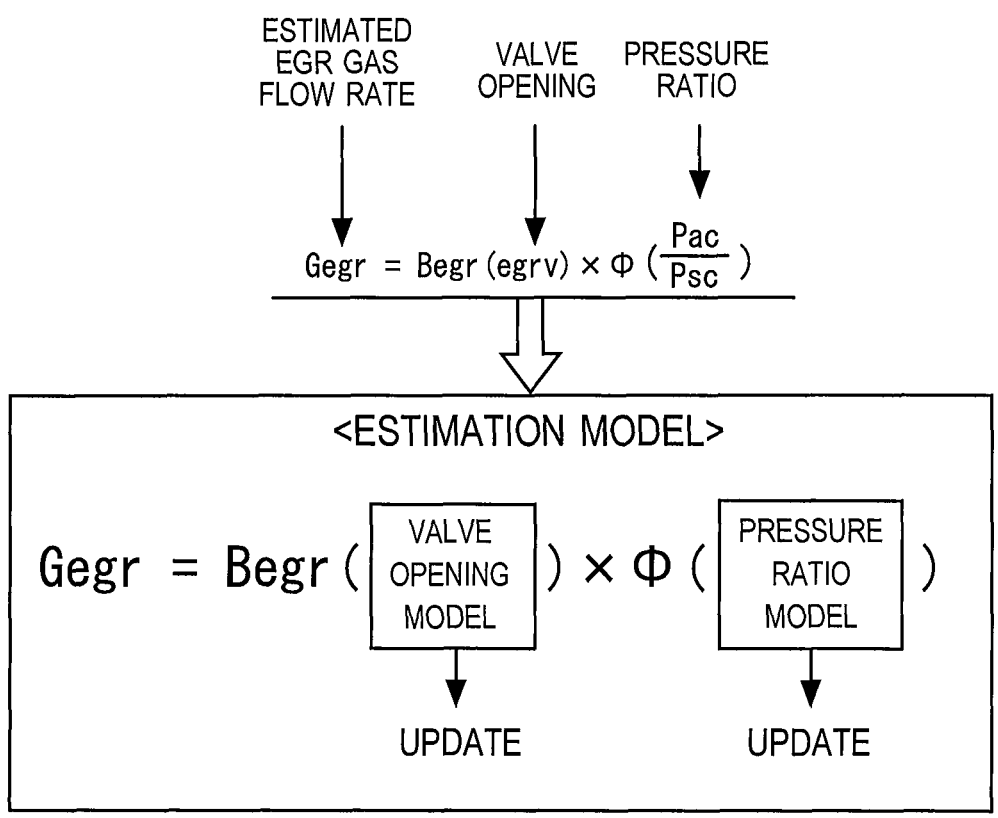
FIG. 2 is a conceptual diagram showing an estimation model in the first embodiment.

FIG. 2 is a conceptual diagram showing the estimation model used for calculating the estimated EGR gas flow rate Gegr (namely, the estimated EGR ratio Regr). The estimation model is similar to the above-mentioned equation (2) and is configured to calculate the estimated EGR gas flow rate Gegr based on the valve opening egrv and the pressure ratio Pac/Psc. Note, however, that the valve opening egrv is represented by a "valve opening model" in which an error of the valve opening egrv is considered. Similarly, the pressure ratio Pac/Pac is represented by a "pressure ratio model" in which an error of the pressure ratio Pac/Psc is considered. Each of the valve opening model and the pressure ratio model will be described below in detail.

1-2-1. Valve Opening Model

The valve opening egrv of the EGR valve 53 is detected by the opening sensor 55. However, the valve opening egrv being the detected value is likely to include errors due to a variety of factors. That is, the valve opening egrv output from the opening sensor 55 is likely to be different from an actual opening of the EGR valve 53.

Examples of the errors that can be included in the valve opening egrv output from the opening sensor 55 will be described below with reference to FIG. 3. The EGR valve 53 is connected to the motor 54 being an actuator. The EGR valve 53 opens and closes with rotation of the motor 54, and thereby the opening of the EGR valve 53 is changed. The opening sensor 55 detects the valve opening egrv of the EGR valve 53 based on a rotation angle of the motor 54.

<Factor 1> Firstly, manufacturing variability and aged deterioration of the opening sensor 55 itself cause the error of the valve opening egrv.

<Factor 2> Machineries such as the motor 54 and gears (not shown) exist between the EGR valve 53 and the opening sensor 55. Manufacturing variability and aged deterioration of the machineries also cause the error of the valve opening egrv.

Figure 3:
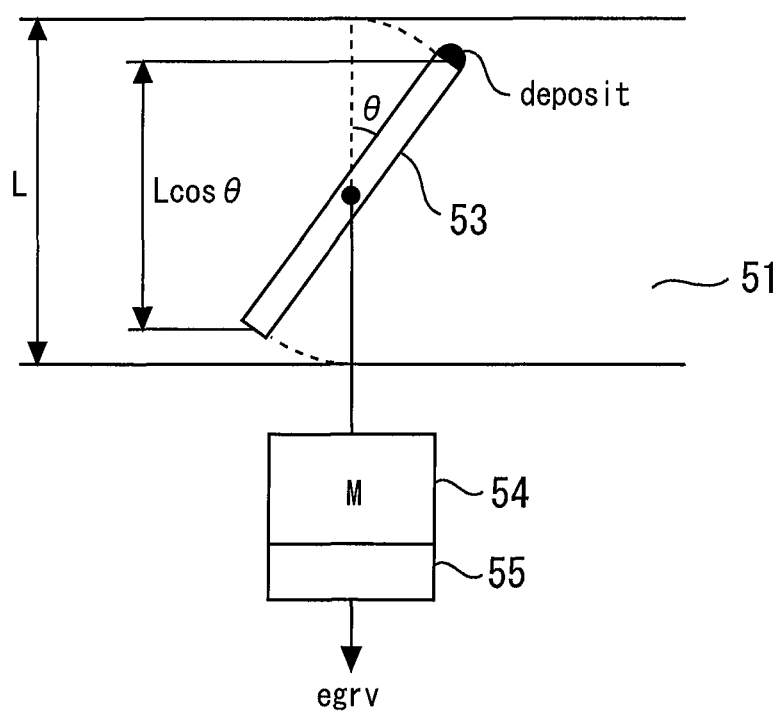
FIG. 3 is a conceptual diagram for explaining an error included in a valve opening detected by a sensor.

<Factor 3> In a plan view shown in FIG. 3, a width of the EGR passage 51 is represented by "L", a rotation angle of the EGR valve 53 is represented by "θ", and an opening width (corresponding to an opening area) of the EGR valve 53 is represented by "L(1−cos θ)". However, when deposit is attached to the EGR valve 53, an actual opening width becomes smaller than L(1−cos θ), that is, a "virtual rotation angle" of the EGR valve 53 becomes smaller than θ. Meanwhile, the opening sensor 55 cannot recognize existence of the deposit, and detects the valve opening egrv based on the rotation angle of the motor 54, namely the rotation angle θ. Therefore, a difference occurs between the "valve opening egrv as the detected value" and the "virtual valve opening". Such the difference can be treated as the error of the valve opening egrv.

As described above, the valve opening egrv being the detected value is likely to include the error. The error can be said an offset of the valve opening egrv. If the estimated EGR gas flow rate Gegr is calculated by substituting the valve opening egrv including the error into the above equation (2), the error of the estimated EGR gas flow rate Gegr increases.

In view of the above, according to the present embodiment, the valve opening egrv is corrected in consideration of the error. It is the valve opening model that is used for performing the correction. That is, the valve opening model is configured to correct the valve opening egrv so as to cancel out the error of the valve opening egrv. When the correction amount of the valve opening egrv is represented by a correction value α, the valve opening egrv after the correction is represented as follows.

<Valve Opening Model>

Valve opening *egrv* after correction=valve opening *egrv* as detected value+correction value α

The valve opening model includes the valve opening egrv being the detected value and the correction value α of the valve opening egrv. The correction value α is a variable and updatable. More specifically, an initial value of the correction value α is set to zero. Then, the correction value α is updated, through learning, so as to cancel out the error of the valve opening egrv. Updating the correction value α means updating the valve opening model. That is to say, the valve opening model according to the present embodiment is updatable and updated so as to cancel out the error of the valve opening egrv.

Figure 4:
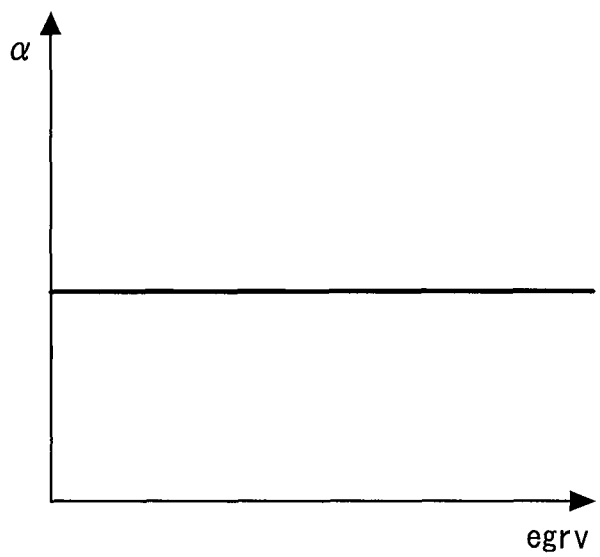
FIG. 4 is a conceptual diagram for explaining a correction value α of the valve opening.

FIG. 4 is a conceptual diagram showing a characteristic of the correction value α(i.e. the error of the valve opening egrv). In FIG. 4, a horizontal axis represents the valve opening egrv, and a vertical axis represents the correction value α. As can be understood from the above-described Factors 1 to 3, the error of the valve opening egrv is an offset independent of the amount of the valve opening egrv. Therefore, the correction value α also is independent of the amount of the valve opening egrv.

Figure 5:
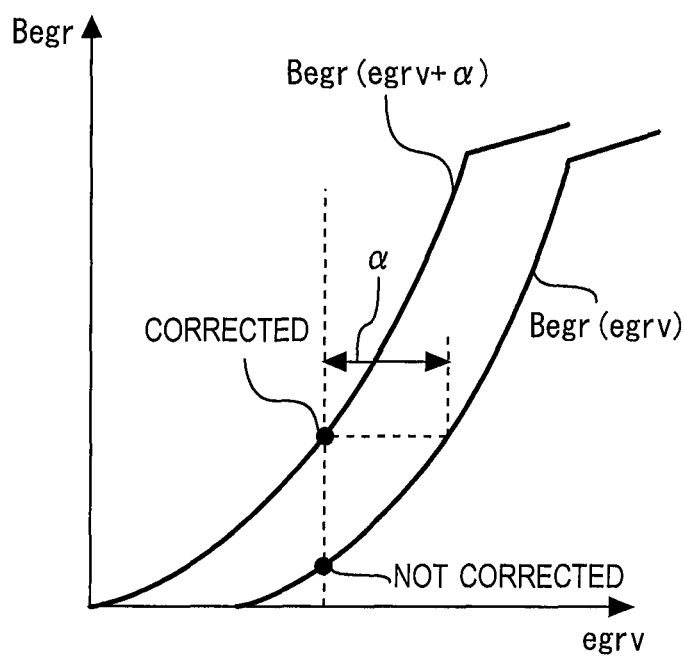
FIG. 5 is a conceptual diagram for explaining correction of a flow coefficient.

FIG. 5 is a conceptual diagram for explaining correction of the flow coefficient Begr. A horizontal axis represents the valve opening egrv, and a vertical axis represents the flow coefficient Begr. Both a case where the valve opening egrv being the detected value is used as it is and a case where the corrected valve opening egrv (=egrv+α) corrected by the valve opening model is used are shown in FIG. 5. By using the valve opening model, the error of the valve opening egrv is canceled out and thus calculation accuracy of the flow coefficient Begr is increased.

1-2-2. Pressure Ratio Model

In the present embodiment, the pressure ratio Pac/Psc is represented as a function of the fresh air flow rate ga detected by the air flow meter 22. More specifically, the pressure ratio Pac/Psc is represented by the following equation (3).

[Equation 3]

$$\frac{Pac}{Psc} = \frac{a_1 \times ga^2 + a_2 \times ga + Pa}{b_1 \times ga^2 + b_2 \times ga + Pa} \quad (3)$$

Here, Pa represents an atmospheric pressure. Coefficients $a_1$, $a_2$, $b_1$, and $b_2$ are decided in advance through experiments and simulations. When the equation (3) is used, there is no need to directly measure the gas pressures Pac and Psc. The air flow meter 22 generally installed in the internal-combustion engine 1 is enough, and thus there is no need to newly install pressure sensors for directly measuring the gas pressures Pac and Psc. Using the equation (3) is preferable in that the pressure ratio Pac/Psc can be calculated without increasing costs.

The pressure ratio Pac/Psc calculated by the use of the equation (3) is likely to include an error. The followings can be considered as factors of the error.

<Factor 1> manufacturing variability of an exhaust pipe of the exhaust passage 30

<Factor 2> clogging of UF catalyst (underfloor converter) in the exhaust passage 30 that increases as time proceeds <Factor 3> clogging of the air cleaner 21 in the intake passage 20 that increases as time proceeds If the estimated EGR gas flow rate Gegr is calculated by substituting the pressure ratio Pac/Psc including the error into the above equation (2), the error of the estimated EGR gas flow rate Gegr increases. Therefore, according to the present embodiment, the pressure ratio Pac/Psc is corrected in consideration of the error. It is the pressure ratio model that is used for performing the correction. That is, the pressure ratio model is configured to correct the pressure ratio Pac/Psc so as to cancel out the error of the pressure ratio Pac/Psc. When the correction amount of the pressure ratio Pac/Psc is represented by a correction value β, the pressure ratio Pac/Psc after the correction is represented as follows.

<Pressure Ratio Model>

Pressure ratio *Pac/Psc* after correction=pressure ratio *Pac/Psc*+correction value β

The pressure ratio model includes the pressure ratio Pac/Psc calculated by the equation (3) and the correction value β of the pressure ratio Pac/Psc. The correction value β is a variable and updatable. More specifically, an initial value of the correction value β is set to zero. Then, the correction value β is updated, through learning, so as to cancel out the error of the pressure ratio Pac/Psc. Updating the correction value β means updating the pressure ratio model. That is to say, the pressure ratio model according to the present embodiment is updatable and updated so as to cancel out the error of the pressure ratio Pac/Psc.

Alternatively, the above equation (3) itself may be used as the pressure ratio model. In this case, the coefficients $a_1$, $a_2$, $b_1$, and $b_2$ are treated as variables and the coefficients $a_1$, $a_2$, $b_1$, and $b_2$ are updated. However, as the variables increase in number, more measurement data are necessary for the updating and numerical computation for the updating becomes more complicated, which causes increase in computation load and computation time. On the other hand, in the case of the above-described pressure ratio model that includes the correction value β separately from the pressure ratio Pac/Psc, the number of variables to be updated is decreased, which is preferable in terms of reduction in the computation load and the computation time.

Figure 6:
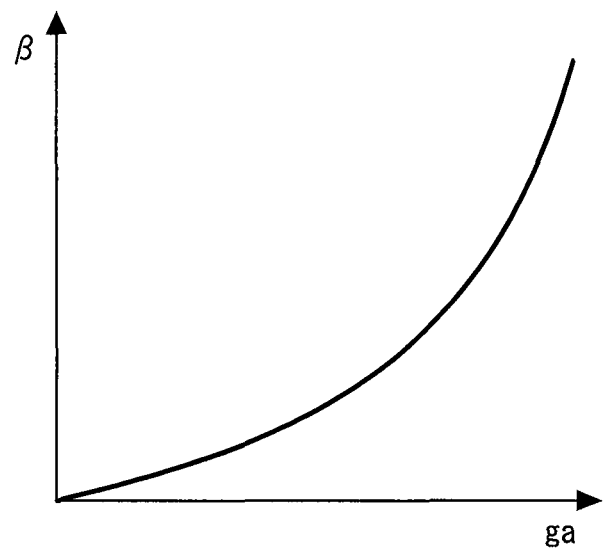
FIG. 6 is a conceptual diagram for explaining an error included in a pressure ratio.

FIG. 6 is a conceptual diagram showing a characteristic of the correction value β (i.e. the error of the pressure ratio Pac/Psc). In FIG. 6, a horizontal axis represents the fresh air flow rate ga, and a vertical axis represents the correction value β. Since the pressure ratio Pac/Psc depends on the fresh air flow rate ga, the error of the pressure ratio Pac/Psc, namely the correction value β also is considered to depend on the fresh air flow rate ga. That is, the correction value β is represented as a function of the fresh air flow rate ga. In particular, the inventors of the present application have confirmed through experiments and simulations that the correction value β is represented by the following approximate equation (4) with high accuracy.

[Equation 4]

$$\beta = c \times ga^2 \quad (4)$$

In the equation (4), c represents a correction coefficient. An initial value of the correction coefficient c is set to zero. Then, the correction coefficient c is updated, through learning, so as to cancel out the error of the pressure ratio Pac/Psc. Updating the correction coefficient c means updating the correction value β and thus means updating the pressure ratio model.

Figure 7:
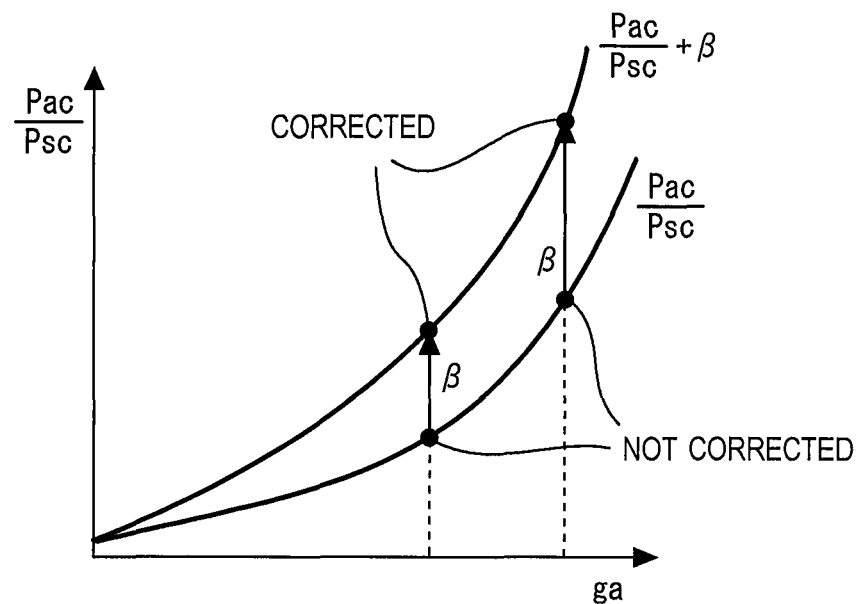
FIG. 7 is a conceptual diagram for explaining a correction value β of the pressure ratio.

FIG. 7 is a conceptual diagram for explaining correction of the pressure ratio Pac/Psc. A horizontal axis represents the fresh air flow rate ga, and a vertical axis represents the pressure ratio Pac/Psc. Both the pressure ratio Pac/Psc calculated simply by the equation (3) and the corrected pressure ratio (=Pac/Psc+β) corrected by the pressure ratio model are shown in FIG. 7. By using the pressure ratio model, calculation accuracy of the pressure ratio Pac/Psc is increased.

1-2-3. Estimation Model

When the valve opening model and the pressure ratio model described above are used, the estimation model for calculating the estimated EGR gas flow rate Gegr is given by the following equation (5).

[Equation 5]

$$Gegr = Begr(egrv + \alpha) \times \Phi\left(\frac{Pac}{Psc} + \beta\right) \quad (5)$$
$$= Begr(egrv + \alpha) \times \Phi\left(\frac{a_1 \times ga^2 + a_2 \times ga + Pa}{b_1 \times ga^2 + b_2 \times ga + Pa} + c \times ga^2\right)$$

In the equation (5), the valve opening egrv and the fresh air flow rate ga are the detected values obtained by the sensors, respectively. The atmospheric pressure Pa and the coefficients $a_1$, $a_2$, $b_1$, and $b_2$ are knows parameters. The variables are only two, the correction value α and the correction coefficient c. The equation (5) and the above equation (1) can be collectively referred to as the estimation model for calculating the estimated EGR ratio Regr. The estimation model (the equations, parameters, and variables) are stored in the memory of the control device 100.

An error of the estimated EGR gas flow rate Gegr given by the equation (5) may occur due to the manufacturing variability and the aged deterioration. In that case, the estimation model is updated such that the error of the estimated EGR gas flow rate Gegr is reduced. More specifically, the two variables, namely the correction value α and the correction value β (i.e. the correction coefficient c) are updated. Since the variables that should be updated are only two, the computation load and the computation time required for updating the estimation model can be suppressed.

It should be noted that a frequency of updating the correction value α and a frequency of updating the correction value β may be different from each other. As an example, let us consider a case where a secular change in the error of the valve opening egrv is quite small in comparison to a secular change in the error of the pressure ratio Pac/Psc. In this case, it may be possible to once update both the correction value α and the correction value β and thereafter update only the correction value β for a certain period of time.

One of features of the present embodiment is that the error of the pressure ratio Pac/Psc is explicitly considered in the estimation model. Here, as a comparative example, let us consider an estimation model in which the error of the pressure ratio Pac/Psc is not taken into consideration. In the case of the comparative example, the estimation model does not include the correction value β of the pressure ratio Pac/Psc, and thus only the correction value α is updated. In this case, not only the error of the valve opening egrv but also the error of the pressure ratio Pac/Psc is absorbed by the correction value α. However, the cause of the error of the pressure ratio Pac/Psc is different from the cause of the error of the valve opening egrv. Therefore, to absorb the error of the pressure ratio Pac/Psc by the correction value α is essentially incorrect.

Figure 8:
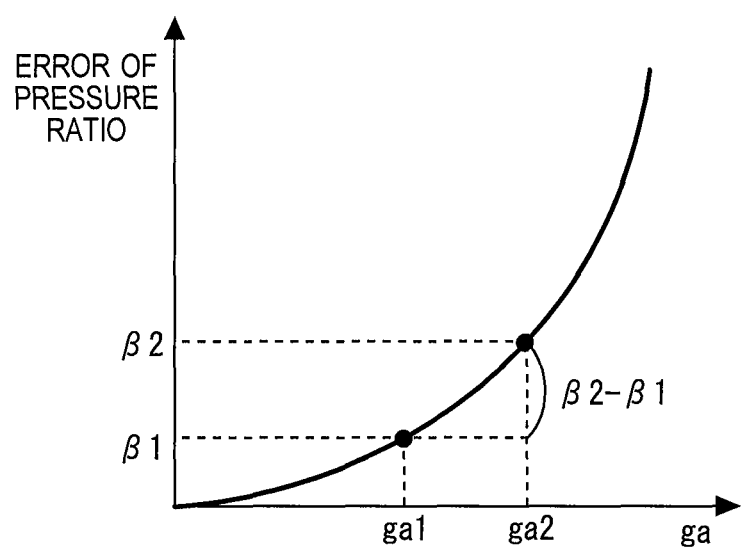
FIG. 8 is a conceptual diagram for explaining change in an error of the pressure ratio in a transition period.

The estimation error in the case of the comparative example becomes particularly conspicuous in a transition period during which the fresh air flow rate ga varies. This problem will be described with reference to FIG. 8. In FIG. 8, a horizontal axis represents the fresh air flow rate ga, and a vertical axis represents the error of the pressure ratio Pac/Psc. In FIG. 8, "ga1" represents the fresh air flow rate ga in a first operating state, "β1" represents the error of the pressure ratio Pac/Psc in the first operating state, "ga2" is the fresh air flow rate ga in a second operating state different from the first operating state, and "β2" is the error of the pressure ratio Pac/Psc in the second operating state. Since the error of the pressure ratio Pac/Psc varies depending on the fresh air flow rate ga as described above, the errors β1 and β2 are different values.

In the first operating state, the estimation model according to the comparative example is updated. At this timing, the error β1 of the pressure ratio Pac/Psc may be absorbed by the correction value α along with the error of the valve opening egrv. However, the estimation model after the update does not address the error β2 in the second operating state. Therefore, when the operating state changes from the first operating state to the second operating state, a new estimation error corresponding to "β2−β1" is caused. In this manner, the estimation model according to the comparative example cannot follow the variation in the fresh air flow rate ga. Thus, the estimation error in the case of the estimation model according to the comparative example is particularly conspicuous in the transition period during which the fresh air flow rate ga varies.

According to the present embodiment, on the other hand, the error of the pressure ratio Pac/Psc is considered in the estimation model. More specifically, the estimation model includes the pressure ratio model, and the pressure ratio model includes the correction value β for canceling out the error of the pressure ratio Pac/Psc. In other words, the correction value β is prepared separately from the correction value α used for canceling out the error of the valve opening egrv. Therefore, the accuracy of the estimation model according to the present embodiment is higher as compared with the case of the comparative example.

In particular, it is preferable that the correction value β is represented as a function of the fresh air flow rate ga. Since the error of the pressure ratio Pac/Psc varies depending on the fresh air flow rate ga, it is possible to correct the error of the pressure ratio Pac/Psc with high accuracy by representing the correction value β as a function of the fresh air flow rate ga. In particular, it is possible to calculate the estimated EGR gas flow rate Gegr with high accuracy even in the transition period when the fresh air flow rate ga varies.

Furthermore, according to the present embodiment, the variables that should be updated in the estimation model are only two, the correction value α and the correction value β (i.e. the correction coefficient c). Therefore, the computation load and the computation time required for updating the estimation model can be suppressed. It can be said that the present embodiment not only improves the accuracy of the estimation model but also secures ease of updating the estimation model.

1-3. Processing by Control Device

1-3-1. Functional Blocks

Figure 9:
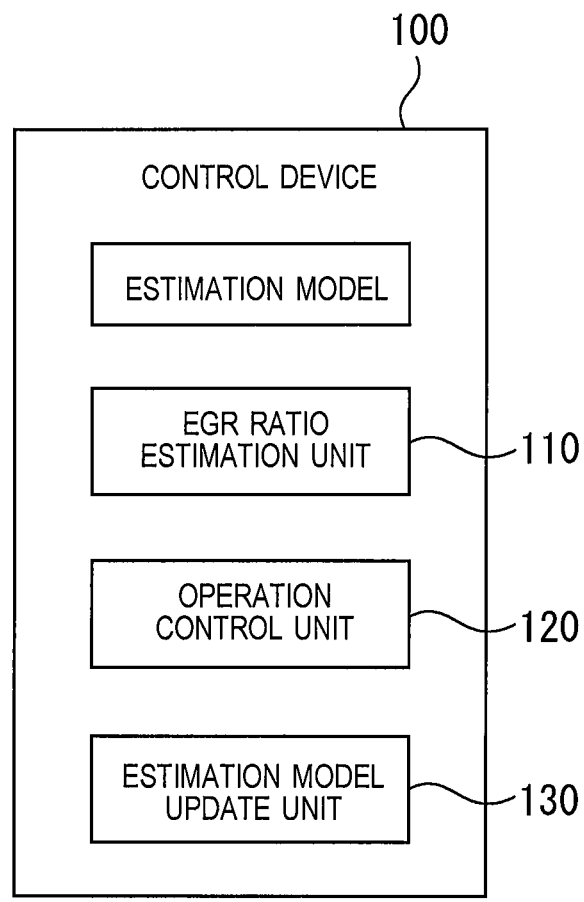
FIG. 9 is a block diagram showing functions of a control device in the first embodiment.

FIG. 9 is a block diagram showing functions of the control device 100 in the present embodiment. The control device 100 has an EGR ratio estimation unit 110, an operation control unit 120, and an estimation model update unit 130 as function blocks. These function blocks are achieved by the processor of the control device 100 executing a control program stored in the memory. Moreover, the above-described estimation model is stored in the memory of the control device 100.

The EGR ratio estimation unit 110 performs "EGR ratio estimation processing" that calculates the estimated EGR ratio Regr by the use of the estimation model. More specifically, the EGR ratio estimation unit 110 receives information of the fresh air flow rate ga detected by the air flow meter 22 and information of the valve opening egrv detected by the opening sensor 55. Then, the EGR ratio estimation unit 110 uses the fresh air flow rate ga, the valve opening egrv, the equation (5), and the equation (1) to calculate the estimated EGR gas flow rate Gegr and the estimated EGR ratio Regr.

The operation control unit 120 performs an operation control of the internal-combustion engine 1 by using the estimated EGR ratio Regr calculated by the EGR ratio estimation unit 110.

For example, the operation control unit 120 determines a target EGR ratio according to an engine operating condition and controls the flow rate of the EGR gas such that the estimated EGR ratio Regr becomes equal to the target EGR ratio. To control the flow rate of the EGR gas, the operation control unit 120 outputs a command to the motor 54 to change the opening of the EGR valve 53. Here, if the accuracy of the estimated EGR ratio Regr is low, a considerable error between the actual EGR ratio and the target EGR ratio is caused. This error causes disturbance in the air-fuel ratio.

Moreover, the operation control unit 120 may determine an optimum ignition timing based on the estimated EGR ratio Regr to control an operation of a spark plug. However, if the accuracy of the estimated EGR ratio Regr is low, the ignition timing determined based on the estimated EGR ratio Regr is not likely to be optimum with respect to the actual EGR ratio, which causes misfire.

It is therefore important to increase the accuracy of the estimated EGR ratio Regr. For that, the estimation model update unit 130 performs "estimation model update processing" that updates the estimation model such that the error of the estimated EGR ratio Regr is reduced. The estimation model update unit 130 may regularly perform the estimation model update processing or perform the estimation model update processing when an update condition is met. Details of the estimation model update processing will be described later.

1-3-2. EGR Ratio Estimation Processing

Figure 10:
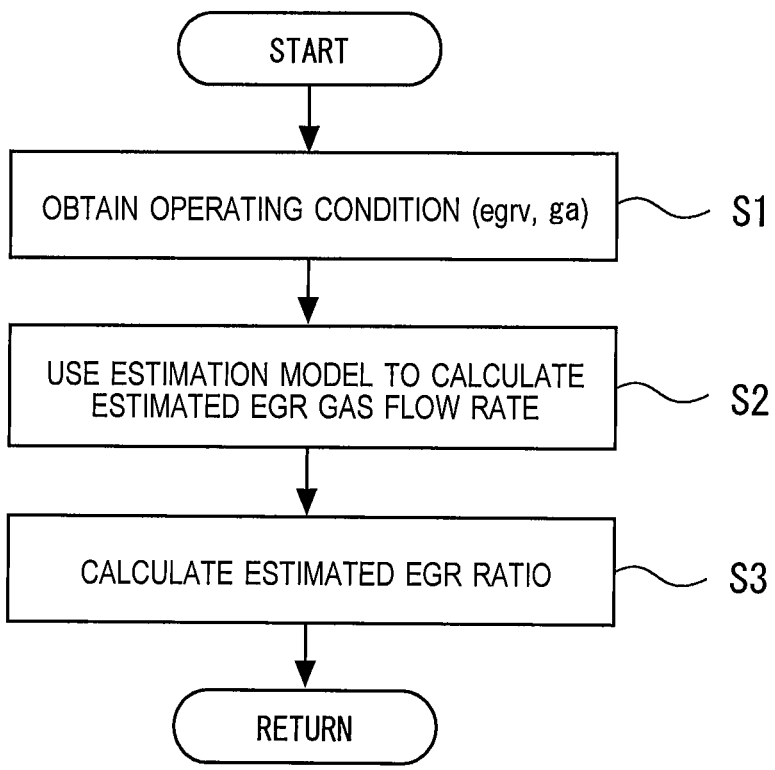
FIG. 10 is a flow chart showing EGR ratio estimation processing in the first embodiment.

FIG. 10 is a flow chart showing the EGR ratio estimation processing performed by the control device 100 (the EGR ratio estimation unit 110). The EGR ratio estimation processing is performed routinely and repeatedly during the operation of the internal-combustion engine 1.

Step S1:

The control device 100 obtains the information of the operating condition. More specifically, the control device 100 obtains the information of the fresh air flow rate ga detected by the air flow meter 22 and the information of the valve opening egrv detected by the opening sensor 55.

Step S2:

The control device 100 uses the fresh air flow rate ga, the valve opening egrv, the equation (3), the equation (4), and the equation (5) to calculate the pressure ratio Pac/Psc, the correction value β, and the estimated EGR gas flow rate Gegr.

Step S3:

The control device 100 uses the fresh air flow rate ga, the estimated EGR gas flow rate Gegr, and the equation (1) to calculate the estimated EGR ratio Regr. Alternatively, Step S2 and Step S3 may be performed together without being distinguished from each other.

1-3-3. Estimation Model Update Processing

Figure 11:
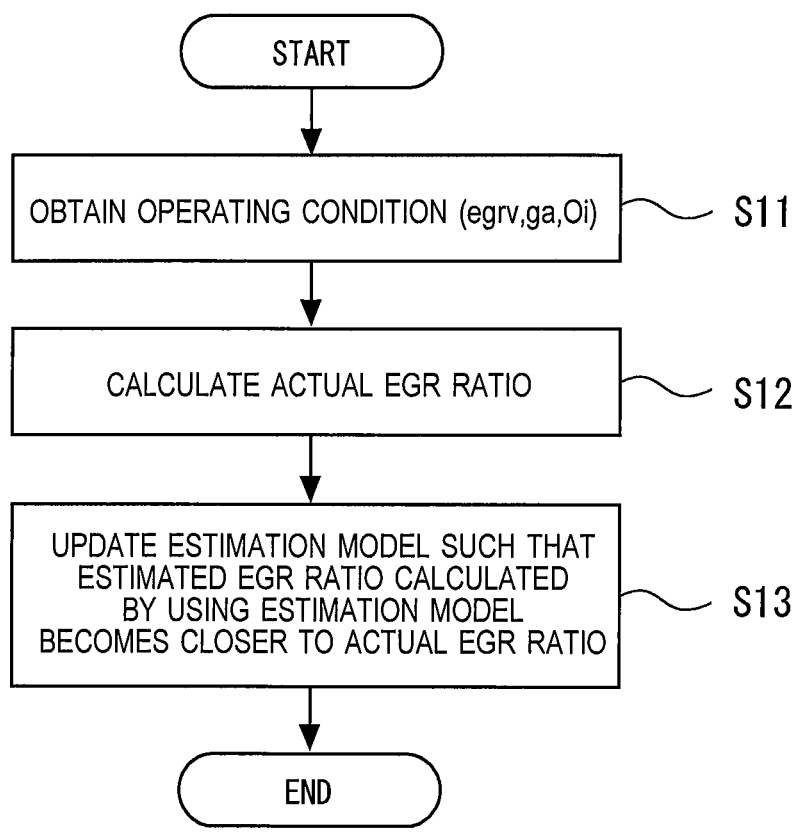
FIG. 11 is a flow chart showing estimation model update processing in the first embodiment.

FIG. 11 is a flow chart showing the estimation model update processing performed by the control device 100 (the estimation model update unit 130).

Step S11:

The control device 100 obtains the information of the operating condition. More specifically, the control device 100 obtains the information of the fresh air flow rate ga detected by the air flow meter 22, the information of the valve opening egrv detected by the opening sensor 55, and the information of the intake $O_2$ concentration Oi detected by the intake $O_2$ sensor 60.

Step S12:

The control device 100 calculates an actual EGR ratio ARegr being the actual EGR ratio. For example, the control device 100 can calculate the actual EGR ratio ARegr by the following equation (6).

[Equation 6]

$$ARegr = 1 - \frac{Oi}{On} \quad (6)$$

In the equation (6), Oi represents the intake $O_2$ concentration measured by the intake $O_2$ sensor 60, and On represents a reference $O_2$ concentration. The reference $O_2$ concentration is an $O_2$ concentration in the intake passage 20 when the internal-combustion engine 1 stops operating, and is approximately equal to an $O_2$ concentration of normal atmosphere.

Regarding the equation (6), we assume stoichiometric combustion or rich combustion, namely, a case where the exhaust gas contains little $O_2$. In a case of lean combustion, an exhaust $O_2$ concentration detected by an air-fuel ratio sensor (not shown) provided in the exhaust passage 30 is further taken into consideration. The actual EGR ratio ARegr can be calculated by the use of a map based on both the intake $O_2$ concentration and the exhaust $O_2$ concentration.

Alternatively, an intake $CO_2$ concentration may be used instead of the intake $O_2$ concentration. In this case, the intake $O_2$ sensor 60 is replaced by an intake $CO_2$ sensor. The intake $CO_2$ sensor detects a $CO_2$ concentration in the mixed gas of the fresh air and the EGR gas in the intake passage 20. The actual EGR ratio ARegr can be calculated based on an increment in the $CO_2$ concentration of the mixed gas with respect to a $CO_2$ concentration of the normal atmosphere.

It should be noted that, during a normal operation, the control device 100 (the operation control unit 120) performs the operation control of the internal-combustion engine 1 by using the estimated EGR ratio Regr instead of the actual EGR ratio ARegr. One of the reasons is that a response ability of the air flow meter 22 is higher than a response ability of the intake $O_2$ sensor 60 or the intake $CO_2$ sensor. In particular, in the transition period, a delay in the detection causes deterioration of the calculation accuracy of the EGR ratio. The estimated EGR ratio Regr can be calculated based on the fresh air flow rate ga detected by the air flow meter 22 with the high response ability. It is therefore preferable to use the estimated EGR ratio Regr for the operation control at the time of the normal operation.

Step S13:

The control device 100 calculates the estimated EGR ratio Regr as in the case of the EGR ratio estimation processing. Then, the control device 100 updates the estimation model such that the estimated EGR ratio Regr becomes closer to the actual EGR ratio ARegr calculated at Step S12. More specifically, the control device 100 updates the correction value α and the correction value β (i.e. the correction coefficient c) such that the estimated EGR ratio Regr becomes closer to the actual EGR ratio ARegr. Updating the correction value α and the correction value β means updating the valve opening model and the pressure ratio model.

In the case where the variables in the estimation model are the two, the correction value α and the correction coefficient c, it is enough to know the fresh air flow rate ga, the valve opening egrv, and the actual EGR ratio ARegr in each of two different steady operating states. For the purpose of explanation, the fresh air flow rate ga and the valve opening egrv in a first steady operating state are collectively referred to as a first detected parameter (ga1, egrv1). The actual EGR ratio ARegr calculated in the first steady operating state is referred to as a first actual EGR ratio ARegr1. The actual EGR gas flow rate corresponding to the first actual EGR ratio ARegr1 is referred to as a first actual EGR gas flow rate AGegr1. The fresh air flow rate ga and the valve opening egrv in a second steady operating state different from the first steady operating state are collectively referred to as a second detected parameter (ga2, egrv2). The actual EGR ratio ARegr calculated in the second steady operating state is referred to as a second actual EGR ratio ARegr2. The actual EGR gas flow rate corresponding to the second actual EGR ratio ARegr2 is referred to as a second actual EGR gas flow rate AGegr2. In this case, the control device 100 updates the correction value α and the correction coefficient c such that the following equations (7) and (8) are satisfied.

[Equation 7]

$$AGegr1 = Begr(egrv1+\alpha) \times \Phi\left(\frac{a_1 \times ga1^2 + a_2 \times ga1 + Pa}{b_1 \times ga1^2 + b_2 \times ga1 + Pa} + c \times ga1^2\right) \quad (7)$$

[Equation 8]

$$AGegr2 = Begr(egrv2+\alpha) \times \Phi\left(\frac{a_1 \times ga2^2 + a_2 \times ga2 + Pa}{b_1 \times ga2^2 + b_2 \times ga2 + Pa} + c \times ga2^2\right) \quad (8)$$

That is, the control device 100 updates the correction value α and the correction coefficient c such that the estimated EGR ratio Regr corresponding to the first detected parameter becomes closer to the first actual EGR ratio ARegr1 and the estimated EGR ratio Regr corresponding to the second detected parameter becomes closer to the second actual EGR ratio ARegr2. By using the detected parameters in the two different steady operating states, it is possible to concurrently and quickly update the correction value α and the correction coefficient c.

Figure 12:
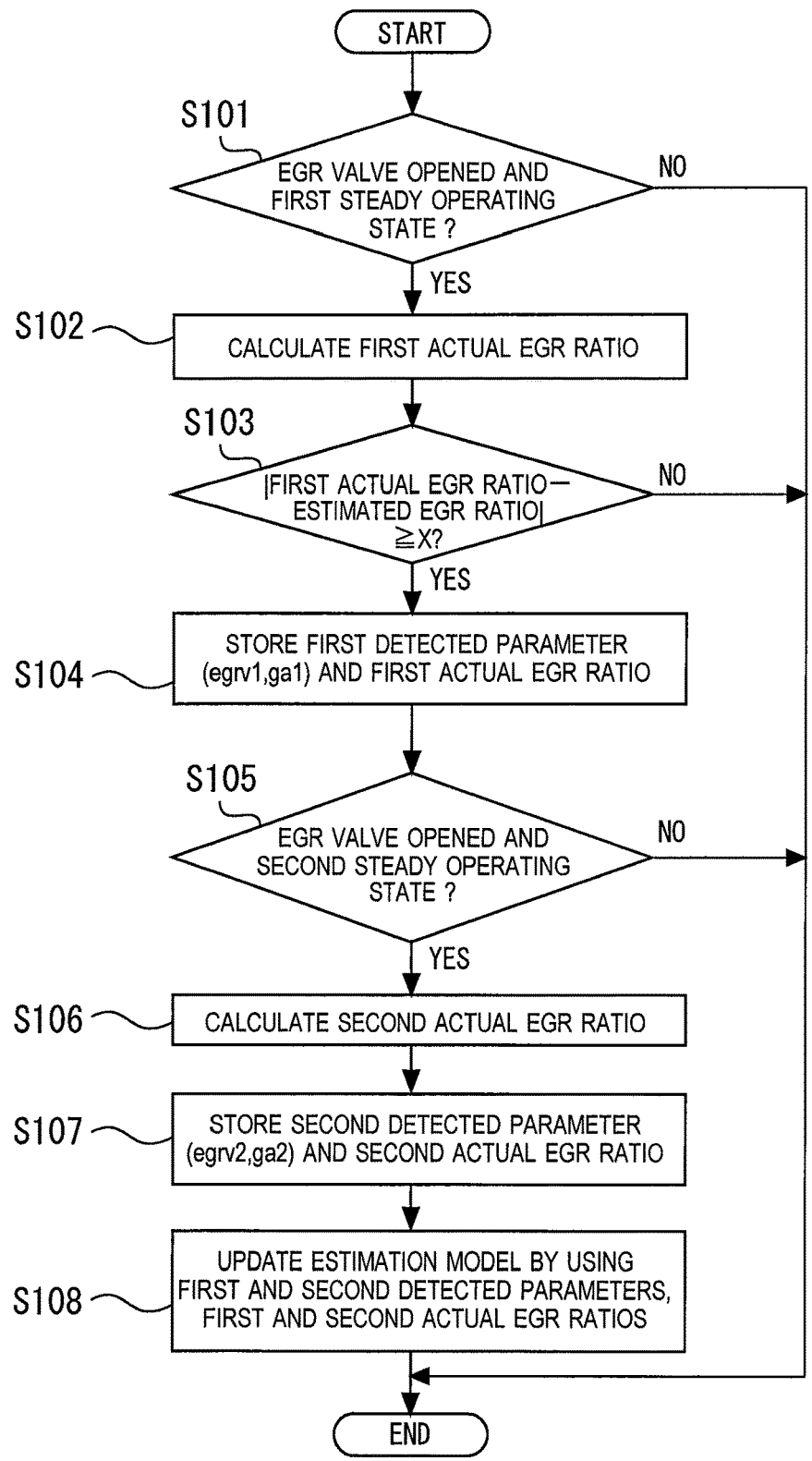
FIG. 12 is a flow chart showing estimation model update processing in the first embodiment.

FIG. 12 is a flow chart schematically showing the estimation model update processing that focuses on two operating states.

Step S101:

The control device 100 determines whether or not the EGR valve 53 is open and the operating state is a steady state (i.e. the first steady operating state). Whether the operating state is a steady state or not is determined, for example, based on variation in the fresh air flow rate ga. If the EGR valve 53 is open and the operating state is the first steady operating state (Step S101; Yes), the processing proceeds to Step S102.

Step S102:

The control device 100 calculates the first actual EGR ratio ARegr1. After that, the processing proceeds to Step S103.

Step S103:

The control device 100 calculates the estimated EGR ratio Regr corresponding to the first detected parameter (ga1, egrv1). Then, the control device 100 compares an error between the first actual EGR ratio ARegr1 and the estimated EGR ratio Regr with a threshold value X. If the error is less than the threshold value X (Step S103; No), there is no need to update the estimation model and thus the estimation model update processing ends. On the other hand, if the error is equal to or more than the threshold value X (Step S103; Yes), the estimation model update processing continues and proceeds to Step S104.

Step S104:

The control device 100 stores the first detected parameter (ga1, egrv1) and the first actual EGR ratio ARegr1 in the memory. Then, the processing proceeds to Step S105.

Step S105:

The control device 100 determines whether or not the EGR valve 53 is open and the operating state is another steady state (i.e. the second steady operating state) different from the first steady operating state. Whether or not the second steady operating state is different from the first steady operating state is determined based on whether a condition represented by the following equation (9) is satisfied or not.

[Equation 9]

$$|egrv1-egrv2| \geq Y, \text{and } |ga1-ga2| \geq Z \quad (9)$$

In the equation (9), Y and Z represent threshold values, respectively. If the condition represented by the equation (9) is satisfied, it is determined that the second steady operating state is different from the first steady operating state. If the EGR valve 53 is open and the operating state is the second steady operating state (Step S105; Yes), the processing proceeds to Step S106.

Step S106:

The control device 100 calculates the second actual EGR ratio ARegr2. After that, the processing proceeds to Step S107.

Step S107:

The control device 100 stores the second detected parameter (ga2, egrv2) and the second actual EGR ratio ARegr2 in the memory. Then, the processing proceeds to Step S108.

Step S108:

The control device 100 updates the estimation model by using the first detected parameter (ga1, egrv1), the first actual EGR ratio ARegr1, the second detected parameter (ga2, egrv2), and the second actual EGR ratio ARegr2 stored in the memory. More specifically, the control device 100 updates the correction value α and the correction coefficient c such that the above equations (7) and (8) are satisfied. The control device 100 stores, in the memory, the estimation model after the update, namely, the correction value α and the correction coefficient c after the update.

1-4. Effects

The estimated EGR ratio Regr depends not only on the valve opening egrv but also on the pressure ratio Pac/Psc. Therefore, not only the error of the valve opening egrv but also the error of the pressure ratio Pac/Psc contributes to the error between the estimated EGR ratio Regr and the actual EGR ratio ARegr. According to the present embodiment, the error of the pressure ratio Pac/Psc is explicitly considered in the estimation model used for calculating the estimated EGR ratio Regr. That is, the error of the pressure ratio Pac/Psc is considered separately from the error of the valve opening egrv.

More specifically, in the estimation model used for calculating the estimated EGR ratio Regr, the pressure ratio Pac/Psc is represented by the pressure ratio model that is updatable. By updating the pressure ratio model such that the estimated EGR ratio Regr becomes closer to the actual EGR ratio ARegr, it is possible to reduce the error of the estimated EGR ratio Regr caused by the error of the pressure ratio Pac/Psc. In this manner, the error of the pressure ratio Pac/Psc is considered in the estimation model, and thereby the accuracy of the estimated EGR ratio Regr is improved. Since the accuracy of the estimated EGR ratio Regr is improved, disturbance in the air-fuel ratio and occurrence of misfire can be suppressed.

Moreover, according to the present embodiment, the pressure ratio model includes the correction value β for correcting the error of the pressure ratio Pac/Psc. In order to update the pressure ratio model, a formula itself for calculating the pressure ratio Pac/Psc does not need to be updated, but the correction value β only has to be updated. Thus, the number of variables that should be updated is small, which is preferable in terms of reduction in the computation load and the computation time.

Furthermore, according to the present embodiment, the pressure ratio Pac/Psc in the pressure ratio model is represented as a function of the fresh air flow rate ga. In this case, there is no need to newly install pressure sensors for directly measuring the gas pressures Pac and Psc. The air flow meter 22 generally installed in the internal-combustion engine 1 is enough for calculating the pressure ratio Pac/Psc. This is preferable in terms of reduction in costs.

Furthermore, according to the present embodiment, the correction value β of the pressure ratio Pac/Psc in the pressure ratio model also is represented as a function of the fresh air flow rate ga. Since the error of the pressure ratio Pac/Psc varies depending on the fresh air flow rate ga, it is possible to correct the error of the pressure ratio Pac/Psc with high accuracy by representing the correction value β as a function of the fresh air flow rate ga. In particular, it is possible to calculate the estimated EGR gas flow rate Gegr with high accuracy even in the transition period when the fresh air flow rate ga varies. In particular, high estimation accuracy can be maintained even in the transition period during which the fresh air flow rate ga varies (see FIG. 8).

Furthermore, according to the present embodiment, the correction value β is represented by "c×ga$^2$." In this case, the variables that should be updated in the estimation model are only two, the correction value α and the correction coefficient c. Therefore, the computation load and the computation time required for updating the estimation model can be suppressed. For example, by using the detected parameters in two different steady operating states, it is possible to concurrently and quickly update the correction value α and the correction coefficient c. It can be said that the present embodiment not only improves the accuracy of the estimation model but also secures ease of updating the estimation model.

2. Second Embodiment

It is also possible to use a "pressure difference" as substitute for the "pressure ratio". The pressure difference is a difference between the gas pressures upstream and downstream of the EGR valve 53, and is represented by "Pac−Psc". In this case, in the above description of the first embodiment, the term "pressure ratio Pac/Psc" is replaced by the "pressure difference Pac−Psc", and the term "pressure ratio model" is replaced by a term "pressure difference model".

To make further generalization, a "pressure parameter" can be used as a term including both concepts of the "pressure ratio" and the "pressure difference". That is, the pressure parameter is the pressure ratio Pac/Psc or the pressure difference Pac−Psc. In this case, in the above description of the first embodiment, the term "pressure ratio Pac/Psc" is replaced by the "pressure parameter", and the term "pressure ratio model" is replaced by a term "pressure parameter model".

3. Third Embodiment

A third embodiment is different from the first embodiment in the equation for calculating the correction value β of the pressure ratio Pac/Psc. An overlapping description with the first embodiment will be omitted as appropriate. According to the present embodiment, the correction value β is represented by the following equation (10) instead of the above equation (4).

[Equation 10]

$$\beta = c \times ga^2 + d \times ga \quad (10)$$

In the equation (10), d represents a correction coefficient. Since a first-order term (d×ga) is added, the correction value β becomes more precise. In the case of the present embodiment, the variables that should be updated in the estimation model are three, the correction value α, the correction coefficients c and d. Therefore, by using the detected parameters in three different steady operating states, it is possible to update the correction value α, the correction coefficients c and d.

Note however that it is the second-order term (c×ga$^2$) that greatly contributes to the correction value β. Therefore, a sufficient accuracy can be achieved even in the case of the above equation (4) in the first embodiment.

4. Fourth Embodiment

A fourth embodiment is different from the first embodiment in the method of calculating the pressure ratio Pac/Psc. An overlapping description with the first embodiment will be omitted as appropriate.

Figure 13:
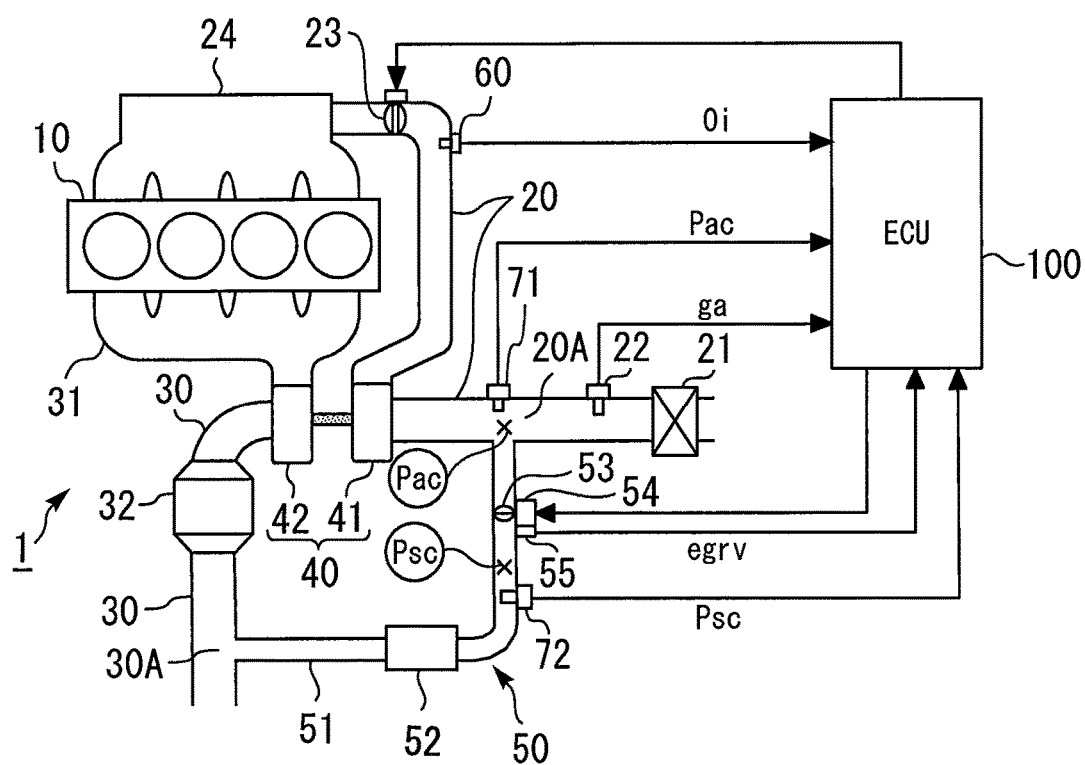
FIG. 13 is a schematic diagram showing a configuration of an internal-combustion engine according to a fourth embodiment of the present invention.

FIG. 13 is a schematic diagram showing a configuration of the internal-combustion engine 1 according to the fourth embodiment. The internal-combustion engine 1 according to the present embodiment is further provided with pressure sensors 71 and 72 in addition to the configuration shown in FIG. 1. The pressure sensor 71 detects the gas pressure Pac downstream of the EGR valve 53. The pressure sensor 72 detects the gas pressure Psc upstream of the EGR valve 53.

The control device 100 receives information of the detected gas pressures Pac and Psc from the pressure sensors 71 and 72, respectively. Then, the control device 100 calculates the pressure ratio Pac/Psc by using the detected gas pressures Pac and Psc instead of the above equation (3). Therefore, according to the present embodiment, the estimation model for calculating the estimated EGR gas flow rate Gegr is given by the following equation (11).

[Equation 11]

$$Gegr = Begr(egrv + \alpha) \times \Phi\left(\frac{Pac}{Psc} + \beta\right) \quad (11)$$

In the present embodiment, the error of the pressure ratio Pac/Psc is caused by manufacturing variability and aged deterioration of the pressure sensors 71 and 72. The correction value β is a parameter for correcting the error of the pressure ratio Pac/Psc. The method of updating the correction value α and the correction value β is the same as in the case of the first embodiment.

According to the present embodiment, there is no need to use an approximate equation such as the equation (3) for calculating the pressure ratio Pac/Psc.

5. Fifth Embodiment

Figure 14:
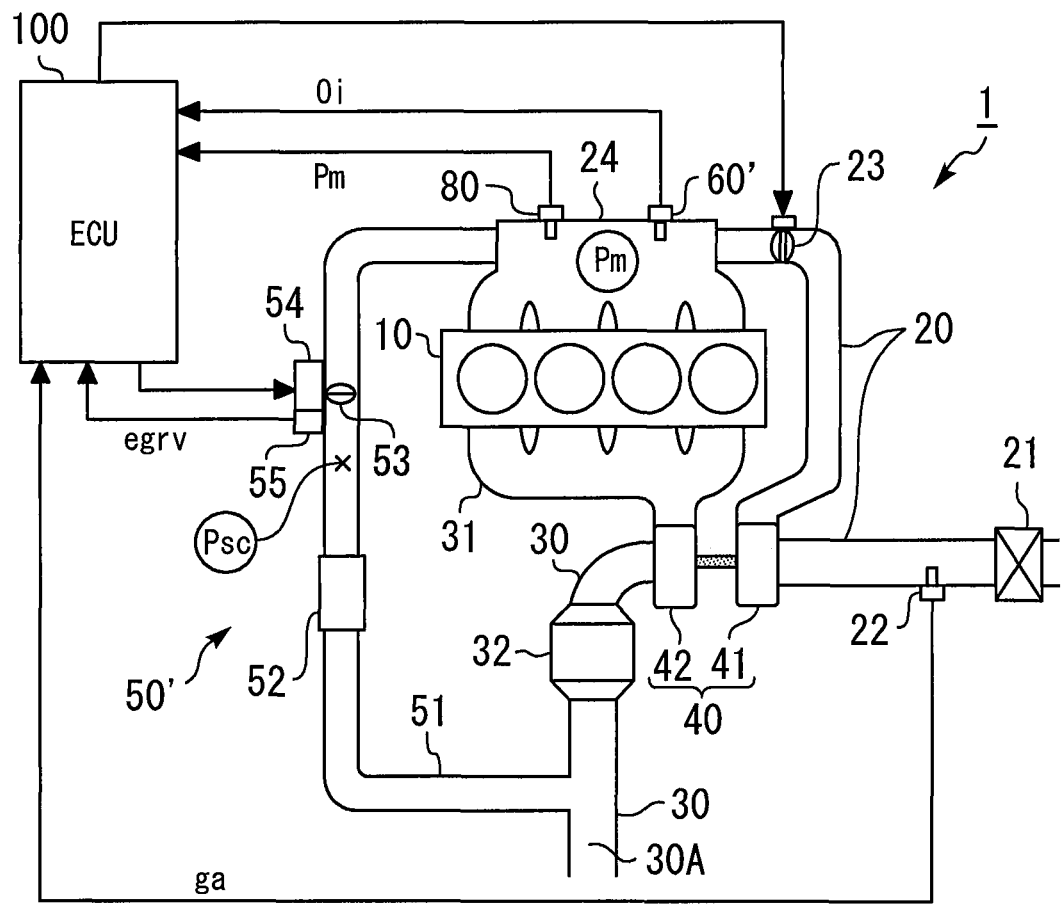
FIG. 14 is a schematic diagram showing a configuration of an internal-combustion engine according to a fifth embodiment of the present invention.

FIG. 14 is a schematic diagram showing a configuration of the internal-combustion engine 1 according to a fifth embodiment. An overlapping description with the first embodiment will be omitted as appropriate.

According to the present embodiment, the EGR gas is not emitted to the intake passage 20A shown in FIG. 1 but to the intake manifold 24 in the intake passage 20. For that, an EGR device 50' is used instead of the EGR device 50. The EGR device 50' connects between the exhaust passage 30A and the intake manifold 24, and recirculates a portion of the exhaust gas flowing through the exhaust passage 30A from the exhaust passage 30A to the intake manifold 24.

The gas pressure upstream of the EGR valve 53 is Psc that is the same as in the case of the first embodiment. On the other hand, the gas pressure downstream of the EGR valve 53 is a gas pressure Pm in the intake manifold 24. Therefore, the pressure ratio in the present embodiment is represented by "Pm/Psc". The gas pressure Psc is represented as a function of the fresh air flow rate ga, as in the case of the first embodiment. On the other hand, the gas pressure Pm has no correlation with the fresh air flow rate ga. Therefore, in the present embodiment, the estimation model for calculating the estimated EGR gas flow rate Gegr is given by the following equation (12).

[Equation 12]

$$Gegr = Begr(egrv + \alpha) \times \Phi\left(\frac{Pm}{Psc \times (1 + \beta')}\right) \quad (12)$$
$$= Begr(egrv + \alpha) \times \Phi\left(\frac{Pm}{Psc} \times \frac{1}{1 + \beta'}\right)$$

In the equation (12), β' represents a correction value of the gas pressure Psc. A variation of the gas pressure Psc due to the aged deterioration is very small in comparison to a nominal value of the gas pressure Psc. That is, the correction value β' is considerably smaller than 1 (β'<<1). Therefore, the equation (12) can be modified to the following equation (13).

[Equation 13]

$$Gegr = Begr(egrv + \alpha) \times \Phi\left(\frac{Pm}{Psc} \times (1 - \beta')\right) \quad (13)$$

As described above, the gas pressure Pm in the intake manifold 24 is independent of the fresh air flow rate ga. Therefore, an intake pressure sensor 80 for detecting the gas pressure Pm is provided in the intake manifold 24, as shown in FIG. 14. The control device 100 receives information of the gas pressure Pm detected by the intake pressure sensor 80 in addition to the fresh air flow rate ga and the valve opening egrv. Then, the control device 100 performs the EGR ratio estimation processing based on the detected parameters (ga, egrv, Pm) and the equation (12) or the equation (13).

In the estimation model update processing, the $O_2$ concentration in the mixed gas of the fresh air and the EGR gas is necessary for calculating the actual EGR ratio ARegr. For that, an intake $O_2$ sensor 60' is provided in the intake manifold 24 as shown in FIG. 14. The intake $O_2$ sensor 60' detects the intake $O_2$ concentration Oi in the intake manifold 24. The control device 100 calculates the actual EGR ratio ARegr based on the detected intake $O_2$ concentration Oi. The other processing in the estimation model update processing is the same as in the case of the first embodiment. The control device 100 updates the correction value α and the correction value β' such that the estimated EGR ratio Regr becomes closer to the actual EGR ratio ARegr.

It should be noted that some of the embodiments described above can be combined with each other in so far as they are not contradictory to each other.

What is claimed is:

1. A control device for an internal-combustion engine, the internal-combustion engine comprising:
   an EGR device configured to recirculate a portion of exhaust gas, as EGR gas, from an exhaust passage to an intake passage through an EGR valve,
   a first sensor configured to detect a fresh air flow rate in the intake passage,
   a pressure parameter being a ratio of or a difference between gas pressures upstream and downstream of the EGR valve, and being represented as a function of the fresh air flow rate,
   an estimation model being configured to calculate an estimated EGR ratio based on the pressure parameter,
   the pressure parameter in the estimation model being represented by a pressure parameter model that is updatable,
   the control device being configured to:
   calculate the pressure parameter by using the fresh air flow rate;
   calculate the estimated EGR ratio by using the estimation model;
   calculate an actual EGR ratio; and
   update the estimation model by updating the pressure parameter model such that the estimated EGR ratio becomes closer to the actual EGR ratio.

2. The control device for the internal-combustion engine according to claim 1, wherein
   the pressure parameter model includes:
   the pressure parameter; and
   a first correction value being a correction value of the pressure parameter, and wherein
   when updating the estimation model, the control device updates the first correction value such that the estimated EGR ratio becomes closer to the actual EGR ratio.

3. The control device for the internal-combustion engine according to claim 2, wherein
   the first correction value each is represented as a function of the fresh air flow rate, and the control device uses the fresh air flow rate to calculate the pressure parameter and the first correction value.

4. The control device for the internal-combustion engine according to claim 3, wherein
the first correction value is represented by $c \times ga^2$, where c is a correction coefficient, and ga is the fresh air flow rate, and
when updating the estimation model, the control device updates the correction coefficient c such that the estimated EGR ratio becomes closer to the actual EGR ratio.

5. A control device for an internal-combustion engine, the internal-combustion engine comprising:
an EGR device configured to recirculate a portion of exhaust gas, as EGR gas, from an exhaust passage to an intake passage through an EGR valve; and
a second sensor group configured to detect the gas pressures upstream and downstream of the EGR valve,
a pressure parameter being a ratio of or a difference between the gas pressures upstream and downstream of the EGR valve,
an estimation model being configured to calculate an estimated EGR ratio based on the pressure parameter,
the pressure parameter in the estimation model being represented by a pressure parameter model that is updatable,
the pressure parameter model including:
the pressure parameter; and
a first correction value being a correction value of the pressure parameter, the control device being configured to:
calculate the pressure parameter by using the gas pressures detected by the second sensor group;
calculate the estimated EGR ratio by using the estimation model;
calculate an actual EGR ratio; and
update the estimation model by updating the first correction value of the pressure parameter model such that the estimated EGR ratio becomes closer to the actual EGR ratio.

6. The control device for the internal-combustion engine according to claim 1, wherein
the estimation model is configured to calculate the estimated EGR ratio based on the pressure parameter and an opening of the EGR valve,
the opening in the estimation model is represented by a valve opening model that is updatable, and
when updating the estimation model, the control device updates the pressure parameter model and the valve opening model such that the estimated EGR ratio becomes closer to the actual EGR ratio.

7. The control device for the internal-combustion engine according to claim 4, wherein
the internal-combustion engine further comprises a third sensor that detects an opening of the EGR valve,
the estimation model is configured to calculate the estimated EGR ratio based on the pressure parameter and the opening, and
the opening in the estimation model is represented by a valve opening model that is updatable, wherein
the valve opening model includes:
the opening detected by the third sensor; and
a second correction value being a correction value of the opening, and wherein
when updating the estimation model, the control device updates the correction coefficient c and the second correction value such that the estimated EGR ratio becomes closer to the actual EGR ratio.

8. The control device for the internal-combustion engine according to claim 7, wherein
a first detected parameter includes the fresh air flow rate and the opening in a first operating state,
a first actual EGR ratio is the actual EGR ratio in the first operating state,
a second detected parameter includes the fresh air flow rate and the opening in a second operating state different from the first operating state,
a second actual EGR ratio is the actual EGR ratio in the second operating state, and
the control device updates the correction coefficient c and the second correction value such that the estimated EGR ratio corresponding to the first detected parameter becomes closer to the first actual EGR ratio and the estimated EGR ratio corresponding to the second detected parameter becomes closer to the second actual EGR ratio.

* * * * *